(12) United States Patent
Lee et al.

(10) Patent No.: US 8,825,899 B2
(45) Date of Patent: Sep. 2, 2014

(54) COMMUNICATION TERMINAL APPARATUS AND METHOD OF PERFORMING COMMUNICATION BY USING PLURALITY OF NETWORK INTERFACES MOUNTED ON THE COMMUNICATION TERMINAL APPARATUS

(75) Inventors: Min-ho Lee, Gwacheon-si (KR); Soo-hong Park, Gwangju-si (KR); Cheol-ju Hwang, Yongin-si (KR); Pyoung-yun Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 261 days.

(21) Appl. No.: 12/246,723

(22) Filed: Oct. 7, 2008

(65) Prior Publication Data

US 2009/0187674 A1 Jul. 23, 2009

(30) Foreign Application Priority Data

Jan. 22, 2008 (KR) ........................ 10-2008-0006685

(51) Int. Cl.
| | | |
|---|---|---|
| *G06F 15/173* | (2006.01) | |
| *H04J 3/00* | (2006.01) | |
| *H04J 3/16* | (2006.01) | |
| *H04J 3/22* | (2006.01) | |
| *H04J 1/00* | (2006.01) | |
| *H04L 29/06* | (2006.01) | |
| *H04L 12/56* | (2006.01) | |

(52) U.S. Cl.
CPC ............ *H04L 69/14* (2013.01); *H04L 47/2475* (2013.01); *H04L 47/24* (2013.01)
USPC ........... 709/238; 709/240; 709/243; 370/464; 370/465; 370/468; 370/480

(58) Field of Classification Search
CPC ....... H04L 69/14; H04L 69/16; H04L 69/165; H04L 29/06; H04L 12/189; H04L 12/5695; H04L 47/805; H04L 47/803
USPC ......... 709/204, 213, 245, 230, 232, 238, 240, 709/242–244; 370/230, 389, 464, 465, 468, 370/470, 472; 713/176
See application file for complete search history.

(56) References Cited

U.S. PATENT DOCUMENTS

| 7,693,056 B2 * | 4/2010 | Heissenbuttel et al. ........ 370/230 |
|---|---|---|
| 2004/0068657 A1 * | 4/2004 | Alexander et al. ............ 713/176 |

(Continued)

OTHER PUBLICATIONS

Korean Office Action mailed Feb. 27, 2014 in corresponding Korean Application No. 10-2008-0006685.

*Primary Examiner* — Tae Kim
(74) *Attorney, Agent, or Firm* — Staas & Halsey LLP (57) ABSTRACT

Provided is a method of performing communication by using a plurality of network interfaces mounted on a communication terminal apparatus. The method includes allocating different Internet protocol (IP) addresses corresponding to the plurality of network interfaces to a plurality of applications of the communication terminal apparatus, relaying data transmitted or received between the plurality of applications and the plurality of network interfaces based on the allocated IP addresses, and simultaneously performing communication with an external network by the plurality of network interfaces through the relaying of the data.

22 Claims, 7 Drawing Sheets

(56) References Cited

U.S. PATENT DOCUMENTS

| | | | |
|---|---|---|---|
| 2006/0274750 A1* | 12/2006 | Babbar et al. | 370/390 |
| 2006/0291392 A1* | 12/2006 | Alicherry et al. | 370/235 |
| 2007/0071004 A1* | 3/2007 | Hasegawa et al. | 370/390 |
| 2007/0110035 A1* | 5/2007 | Bennett | 370/352 |
| 2007/0110080 A1* | 5/2007 | Bennett | 370/400 |
| 2007/0195765 A1* | 8/2007 | Heissenbuttel et al. | 370/389 |
| 2008/0031188 A1* | 2/2008 | Magnusson et al. | 370/329 |
| 2008/0125163 A1* | 5/2008 | Chi et al. | 455/550.1 |

\* cited by examiner

FIG. 8 ated IP addresses, and

COMMUNICATION TERMINAL APPARATUS AND METHOD OF PERFORMING COMMUNICATION BY USING PLURALITY OF NETWORK INTERFACES MOUNTED ON THE COMMUNICATION TERMINAL APPARATUS

CROSS-REFERENCE TO RELATED APPLICATION

This application claims the benefit of Korean Patent Application No. 2008-6685, filed Jan. 22, 2008 in the Korean Intellectual Property Office, the disclosure of which is incorporated herein by reference.

BACKGROUND OF THE INVENTION

1. Field of the Invention

Aspects of the present invention relate to a method of and apparatus for performing communication by using a plurality of network interfaces mounted on a communication terminal apparatus.

2. Description of the Related Art

Figure 1A:
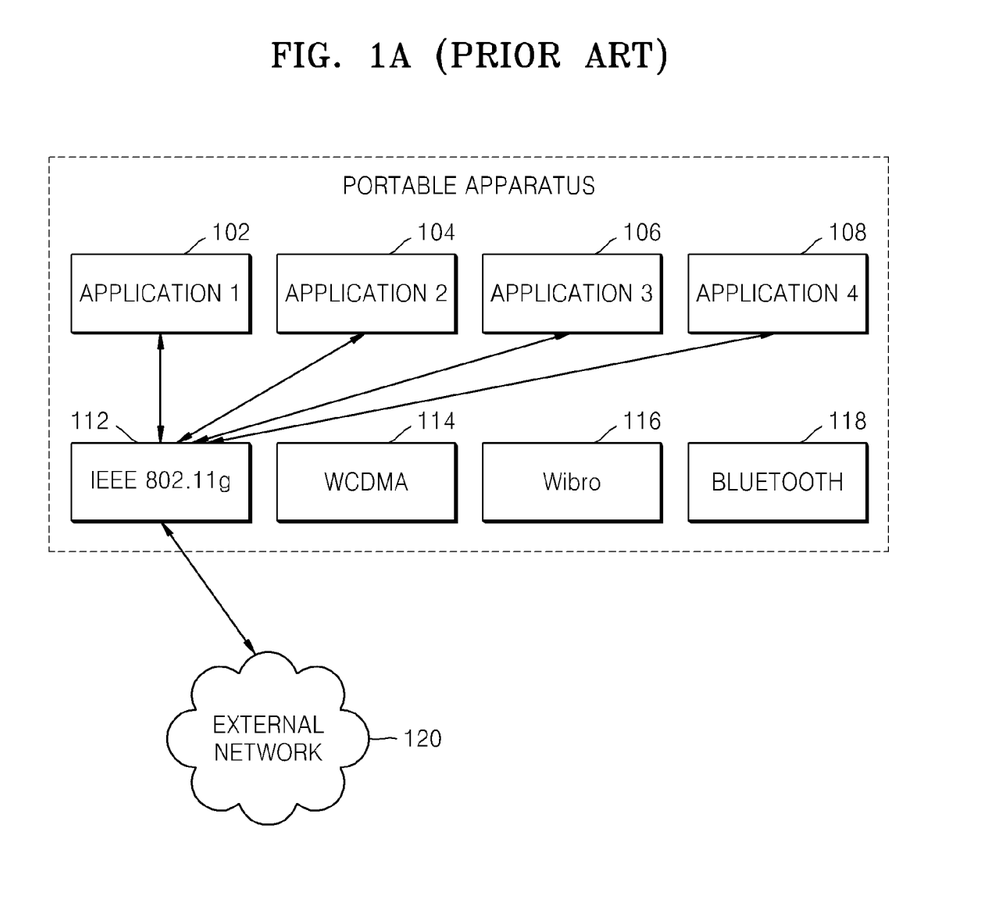
FIGS. 1A and 1B are diagrams for explaining an operation of a conventional portable apparatus having a plurality of network interfaces mounted thereon.
Figure 1B:
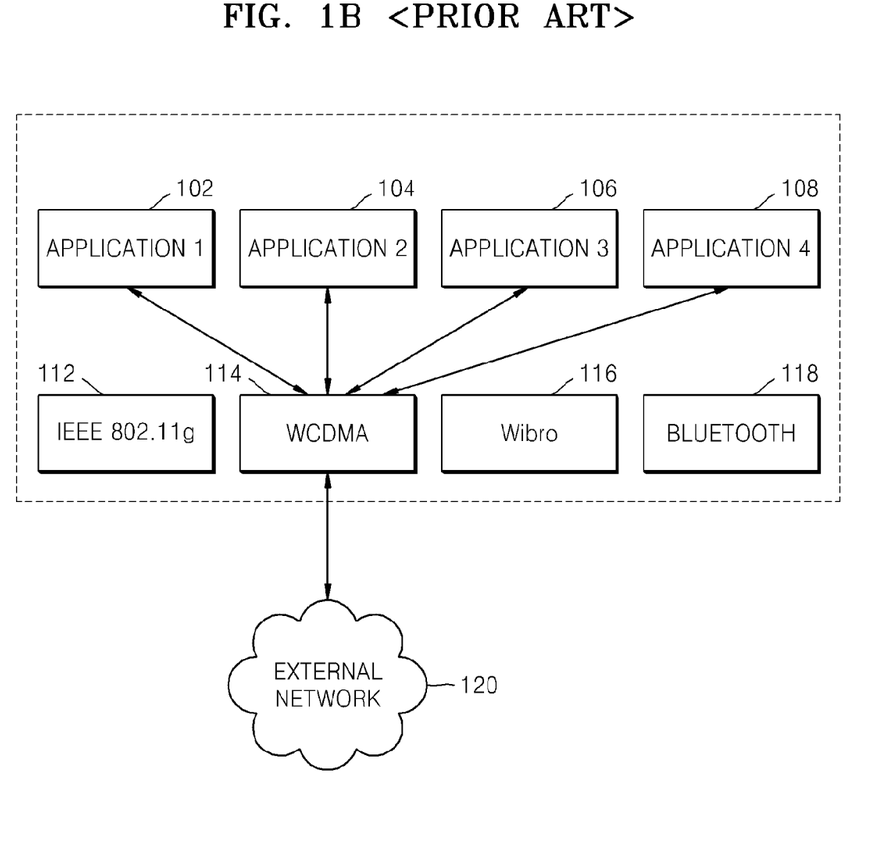

Recently, a plurality of network interfaces have been mounted on various portable apparatuses such as notebooks, portable multimedia players (PMPs), personal digital assistants (PDAs), and cellular phones. FIGS. 1A and 1B are diagrams for explaining an operation of a conventional portable apparatus having a plurality of network interfaces mounted thereon.

Referring to FIG. 1A, the portable apparatus includes a plurality of applications 102, 104, 106, and 108 and a plurality of network interfaces 112, 114, 116, and 118. The plurality of network interfaces 112, 114, 116, and 118 include an IEEE 802.11g interface 112, a wideband code division multiple access (WCDMA) interface 114, a wireless broadband (WiBro) interface 116, and a Bluetooth interface 118. In FIG. 1A, the plurality of applications 102, 104, 106, and 108 all communicate with an external network 120 by using the IEEE 802.11g interface 112. In FIG. 1B, the plurality of applications 102, 104, 106, and 108 all communicate with the external network 120 by using the WCDMA interface 114.

Conventionally, even when the plurality of network interfaces 112, 114, 116, and 118 are mounted on the portable apparatus, as illustrated in FIGS. 1A and 1B, the plurality of applications 102, 104, 106, and 108 all communicate with the external network 120 by using a single network interface 112 or 114. As a result, the remaining network interfaces, except for the single network interface 112 or 114, cannot be utilized, resulting in degradation of communication efficiency.

SUMMARY OF THE INVENTION

Aspects of the present invention provide a method of and apparatus for performing communication by using a plurality of network interfaces at a communication terminal apparatus.

According to an aspect of the present invention, there is provided a method of performing communication by using a plurality of network interfaces mounted on a communication terminal apparatus. The method includes allocating different Internet protocol (IP) addresses of the plurality of network interfaces to a plurality of applications of the communication terminal apparatus, relaying data transmitted or received between the plurality of applications and the plurality of network interfaces based on the allocated IP addresses, and simultaneously performing communication with an external network by the plurality of network interfaces through the relaying of the data.

According to an aspect of the present invention, allocating of the different IP addresses may include allocating the different IP addresses to the plurality of applications based on functions executed by the plurality of applications.

According to an aspect of the present invention, allocating of the different IP addresses may include allocating an IP address corresponding to a constant network interface to an application that executes a function of constantly transmitting or receiving data from among the plurality of applications.

According to an aspect of the present invention, allocating of the different IP addresses may include allocating an IP address corresponding to a high-security network interface to an application that executes a function of transmitting or receiving data with security guaranteed from among the plurality of applications.

According to an aspect of the present invention, allocating of the different IP addresses may include allocating an IP address corresponding to a network interface that supports a high bandwidth to an application that involves transmitting or receiving a large amount of data from among the plurality of applications.

According to an aspect of the present invention, allocating of the different IP addresses may include allocating the different IP addresses to the plurality of applications so that user datagram protocol (UDP) data and transmission control protocol (TCP) data are transmitted or received via different network interfaces when the UDP data and the TCP data exist among the data transmitted or received by the communication terminal.

According to an aspect of the present invention, performing of the communication may include the division of the data into a plurality of data parts based on a bandwidth of each of the plurality of network interfaces and allocating the divided data parts to the plurality of network interfaces, wherein the plurality of network interfaces may transmit or receive the allocated data parts based on the allocation in order to perform the communication.

According to an aspect of the present invention, division of the data into the plurality of data parts may include determining a position for starting the division and a position for finishing the division of the data based on a bandwidth of each of the plurality of network interfaces.

According to an aspect of the present invention, performing of the communication may include assembling a plurality of data parts into a singularity of data based on a bandwidth of each of the plurality of network interfaces and allocation of the divided data parts to the plurality of network interfaces, wherein the plurality of network interfaces may transmit or receive the allocated data parts based on the allocation in order to perform the communication.

According to an aspect of the present invention, assembling of the plurality of data parts into the singularity of data may include determining a position for starting the division and a position for finishing the division of the data based on a bandwidth of each of the plurality of network interfaces.

According to an aspect of the present invention, performing of the communication may include transmitting or receiving a plurality of different-type data via different network interfaces such that the plurality of different-type data are simultaneously transmitted or received.

According to another aspect of the present invention, there is provided a communication terminal apparatus comprising a plurality of network interfaces having different Internet protocol (IP) addresses for communication between the communication terminal apparatus and an external network, an address allocation unit allocating the different IP addresses corresponding to the plurality of network interfaces to a plurality of applications of the communication terminal apparatus, and a relay unit relaying data transmitted or received between the plurality of applications and the plurality of network interfaces based on the allocated IP addresses, wherein the plurality of network interfaces simultaneously perform communication with the external network through the relaying of the relay unit.

According to an aspect of the present invention, address allocation unit may allocate the different IP addresses to the plurality of applications based on functions executed by the plurality of applications.

According to an aspect of the present invention, address allocation unit may allocate an IP address corresponding to a constant network interface to an application that executes a function constantly transmitting or receiving data from among the plurality of applications.

According to an aspect of the present invention, address allocation unit may allocate an IP address corresponding to a high-security network interface to an application from a plurality of applications wherein the application executes a function of transmitting or receiving data with security guaranteed.

According to an aspect of the present invention, address allocation unit may allocate an IP address corresponding to a network interface that supports a high bandwidth to an application that executes a function of transmitting or receiving a large amount of data from among the plurality of applications.

According to an aspect of the present invention, address allocation unit may allocate the different IP addresses to the plurality of applications so that UDP data and TCP data are transmitted or received via different network interfaces when the UDP data and the TCP data exist among the transmitted or received data.

According to an aspect of the present invention, communication terminal apparatus may further include a transmission/reception control unit to divide the data into a plurality of data parts based on a bandwidth of each of the plurality of network interfaces and apportioning the divided data parts to the plurality of network interfaces, wherein the plurality of network interfaces may transmit or receive the apportioned data parts based on the apportion of the transmission/reception control unit in order to perform the communication.

According to an aspect of the present invention, transmission/reception control unit may determine a position for starting the division and a position for finishing the division of the data based on a bandwidth of each of the plurality of network interfaces.

According to an aspect of the present invention, communication terminal apparatus may perform communication by transmitting or receiving a plurality of different-type data via different network interfaces when the plurality of different-type data have to be simultaneously transmitted or received.

According to another aspect of the present invention, there is provided a computer-readable recording medium having recorded thereon a program for executing a method of performing communication by using a plurality of network interfaces mounted on a communication terminal apparatus. The method includes allocating different Internet protocol (IP) addresses corresponding to the plurality of network interfaces to a plurality of applications of the communication terminal apparatus, relaying data transmitted or received between the plurality of applications and the plurality of network interfaces based on the allocated IP addresses, and simultaneously performing communication with an external network by the plurality of network interfaces through the relaying of the data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
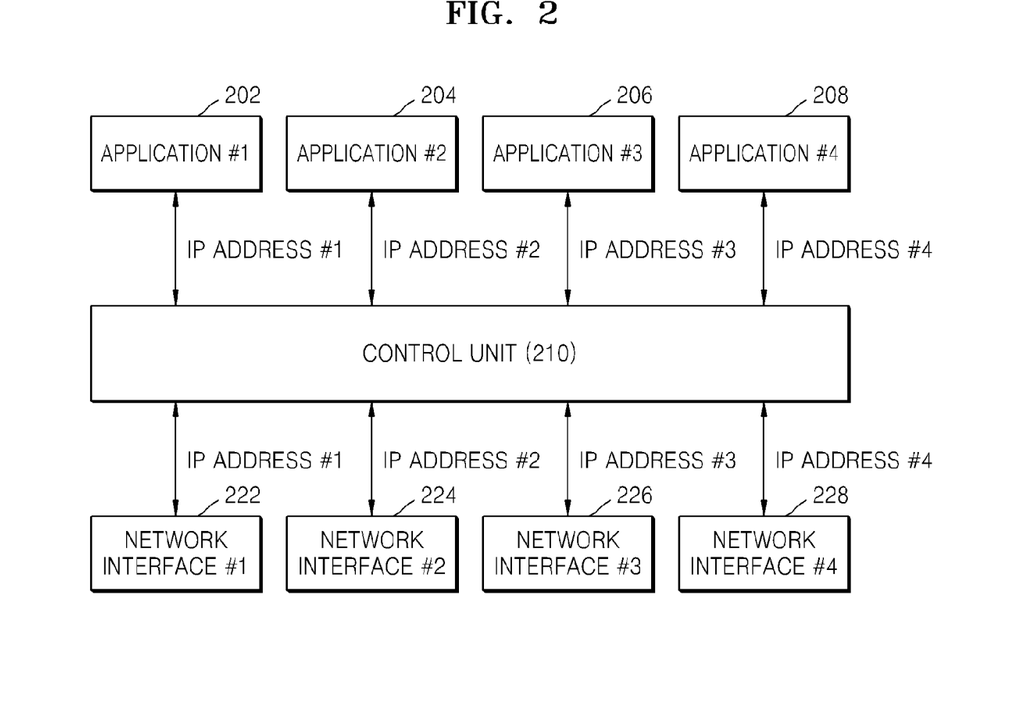
FIG. 2 is a diagram for explaining a communication terminal apparatus according to an embodiment of the present invention.

FIG. 2 is a diagram for explaining a communication terminal apparatus according to an embodiment of the present invention. Referring to FIG. 2, the communication terminal apparatus includes a plurality of applications 202, 204, 206, and 208, a control unit 210, and a plurality of network interfaces 222, 224, 226, and 228. However, it is understood that additional items could be included, such as a display, a microphone, a camera, a speaker, a headphone jack or other like items.

While not restricted thereto, the plurality of applications 202, 204, 206, and 208 mounted on the communication terminal apparatus may include an application for data downloading, a web browser, a voice over Internet protocol (VoIP) application, and an application for Internet banking.

Figure 3:
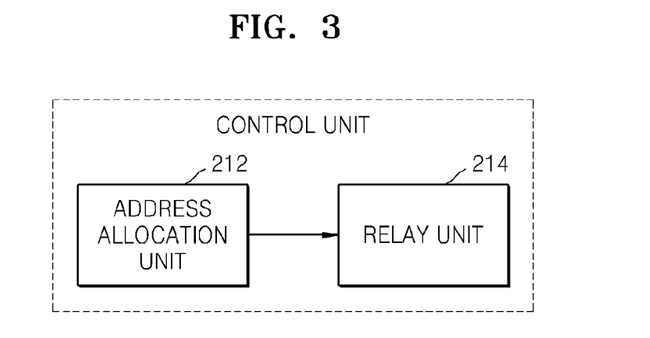
FIG. 3 is a block diagram of a control unit according to an embodiment of the present invention.

FIG. 3 is a diagram for explaining the control unit 210 according to an embodiment of the present invention. The control unit 210 includes an address allocation unit 212 and a relay unit 214. While not required, the control unit 210 can be one or more processors. The address allocation unit 212 allocates different IP addresses corresponding to the plurality of network interfaces 222, 224, 226, and 228 to the plurality of applications 202, 204, 206, and 208 of the communication terminal apparatus. While not limited thereto, it is understood that the address allocation unit 212 may allocate the plurality of applications addresses of the plurality of network interfaces to other types of addresses in addition to or instead of IP addresses, such as Media Access Code (MAC) addresses, Internet protocol security (IPsec) addresses, Internet Group Management protocol (IGMP) addresses or other like protocols.

For example, referring to FIG. 2, the address allocation unit 212 allocates an IP address #1 to the application #1 202, an IP address #2 to the application #2 204, an IP address #3 to the application #3 206, and an IP address #4 to the application #4 208. The IP address #1, the IP address #2, the IP address #3, and the IP address #4 are IP addresses of the network interface #1 222, network interface #2 224, network interface #3 226, and network interface #4 228, respectively.

The relay unit 214 relays data transmitted or received between the plurality of applications 202, 204, 206, and 208 and the plurality of network interfaces 222, 224, 226, and 228 based on the IP addresses allocated by the address allocation unit 212. For example, when the application #1 202 transmits predetermined data to the control unit 210 by using the IP address #1, the relay unit 214 transmits the data to the network interface #1 222 by using the IP address #1. The relay unit 214 may relay data transmitted or received between the plurality of applications 202, 204, 206, and 208 and the plurality of network interfaces 222, 224, 226, and 228 as a switch or a virtual switch. In this way, with aspects of the present invention, since the address allocation unit 212 allocates predetermined IP addresses to the plurality of applications 202, 204, 206, and 208, each of the plurality of applications 202, 204, 206, and 208 recognize and communicate through only one corresponding network interface 222, 224, 226, and 228 as allocated to each of the plurality of applications 202, 204, 206, and 208 when communicating with an external network.

Although the relay unit 214 relays data transmitted or received between the plurality of applications 202, 204, 206, and 208 and the plurality of network interfaces 222, 224, 226, and 228 in FIG. 2, a socket interface (shown in FIG. 4) may be disposed between the plurality of applications 202, 204, 206, and 208. The socket interface may relay data transmitted or received between the plurality of applications 202, 204, 206, and 208 and the control unit 210 according to aspects of the present invention. In this case, the control unit 210 relays data transmitted or received between the socket interface and the plurality of network interfaces 222, 224, 226, and 228 and a buffer (not shown) as a relay operation may also be included in the communication terminal apparatus.

According to aspects of the invention, the plurality of network interfaces 222, 224, 226, and 228 may communicate with an external network at the same time by means of a relay operation of the relay unit 214. For example, in FIG. 2, when the application #1 202 communicates with an external network via the network interface #1 222 using data transmission and reception using the IP address #1, the application #2 204 can also communicate with the external network via the network interface #2 224 using data transmission and reception using the IP address #2. As such, a single application can be assigned plural interfaces so as to simultaneously send elements of a data packet through different interfaces, thereby reducing the data packet transmission time for the whole packet.

Figure 4:
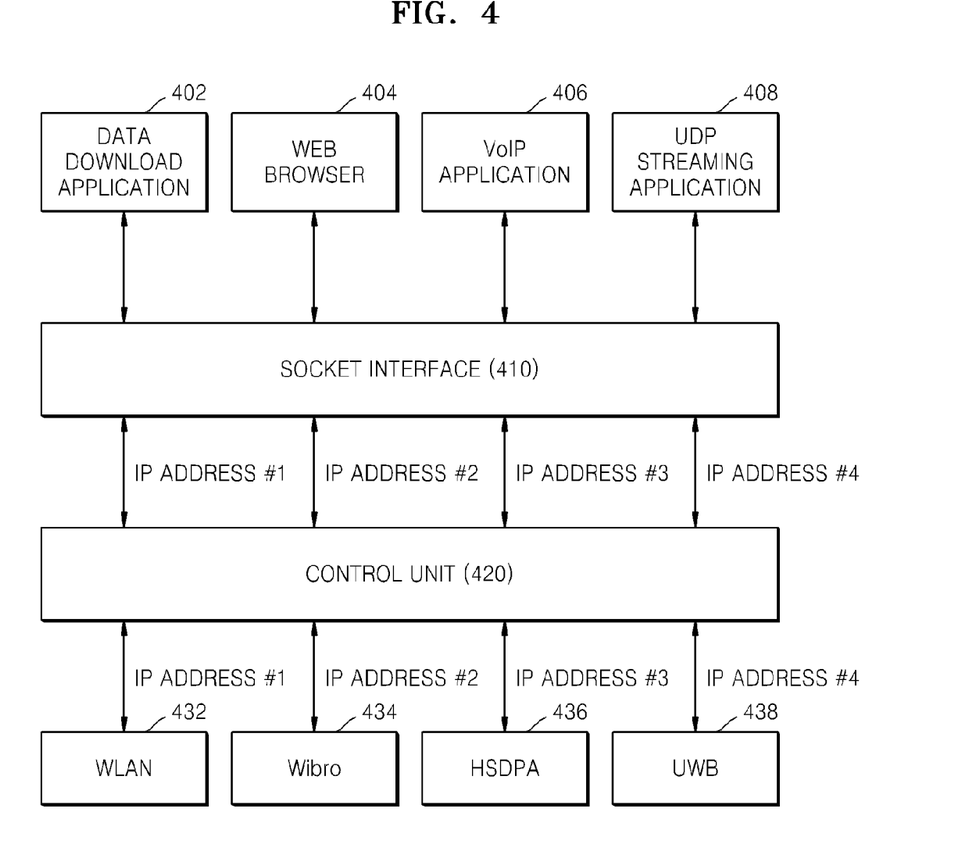
FIG. 4 is a diagram for explaining a first application example of a communication terminal apparatus according to an embodiment of the present invention.

FIG. 4 is a diagram for explaining an application example of a communication terminal apparatus according to an embodiment of the present invention. A plurality of applications 402, 404, 406, and 408 includes a data download application 402, a web browser 404, a VoIP application 406, and a UDP streaming application 408. A plurality of network interfaces 432, 434, 436, and 438 include a wireless local area network (WLAN) interface 432, a wireless broadband (WiBro) interface 434, a high-speed downlink packet access (HSDPA) interface 436, and an ultra-wideband (UWB) interface 438. While described in terms of wireless interfaces, it is understood that a wired interface, such as a USB or LAN connection, can be used in addition to or instead of the shown interfaces.

The control unit 420 allocates IP addresses to the plurality of applications 402, 404, 406, and 408 based on functions executed by the plurality of applications 402, 404, 406, and 408. By such IP address allocation, the plurality of applications 402, 404, 406, and 408 can perform communication by using network interfaces suitable to their functions. While the plurality of applications are shown as a data download application 402, a web browser application 404, a VoIP application 406 and a UDP streaming application 408, it is understood that applications, such as an email application, a video conferencing application, a virtual private network application, a game or other applications transmitting and receiving data can be used in addition to or instead of the shown applications.

For example, an application executing a function constantly transmitting and receiving data may be allocated an IP address corresponding to a constant network interface and an application executing a function of transmitting and receiving data with security guaranteed may be allocated an IP address corresponding to a high-security network interface. An application executing a function transmitting and receiving large amounts of data may be allocated an IP address corresponding to a network interface supporting a high bandwidth.

In FIG. 4, the data download application 402 interworks with the WLAN interface 432 because it requires a high bandwidth, the web browser 404 interworks with the WiBro interface 434 because it does not require a high bandwidth, but requires a broad service coverage area, and the VoIP application 406 interworks with the HSDPA interface 436 because it requires the guarantee of security and service continuity and a broad service coverage area. The UDP streaming application 408 interworks with the UWB interface 438 because it requires high data rate as well as low cost. As mentioned previously, the socket interface 410 relays data transmitted or received between the plurality of applications 402, 404, 406, and 408 and the control unit 420.

Figure 5:
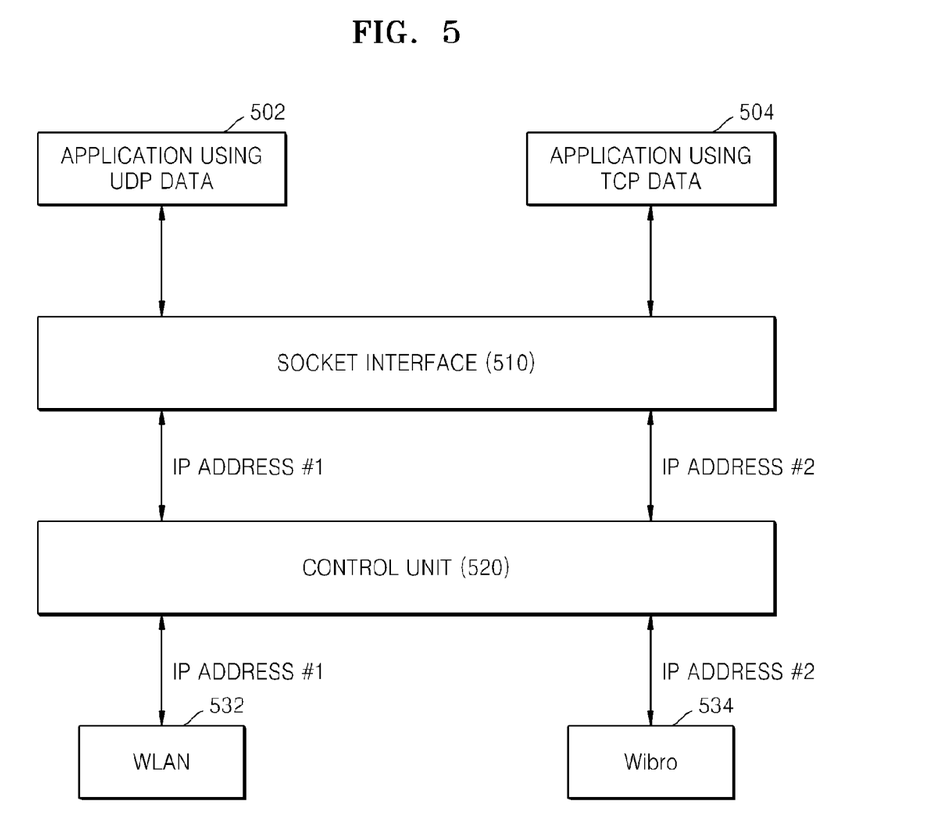
FIG. 5 is a diagram for explaining a second application example of a communication terminal apparatus according to an embodiment of the present invention.

FIG. 5 is a diagram for explaining an application example of a communication terminal apparatus according to an embodiment of the present invention. When UDP data and TCP data exist among transmitted/received data, the performance of TCP data transmission may degrade due to the UDP data that cannot be flow-controlled. FIG. 5 relates to a method of preventing such degradation in the performance of TCP data transmission.

When UDP data and TCP data exist among transmitted/received data, an application 502 using the UDP data and an application 504 using the TCP data communicate with an external network via different network interfaces 532 and 534, thereby preventing the performance of TCP data transmission from degrading. For example, when the application 502 using the UDP data interworks with a WLAN interface 532 and the application 504 using the TCP data interworks with a WiBro interface 534, as illustrated in FIG. 5, the TCP data is not affected by the UDP data because the TCP data and the UDP data are transmitted via the different network interfaces 532 and 534, thereby preventing degradation in the performance of TCP data transmission.

Figure 6:
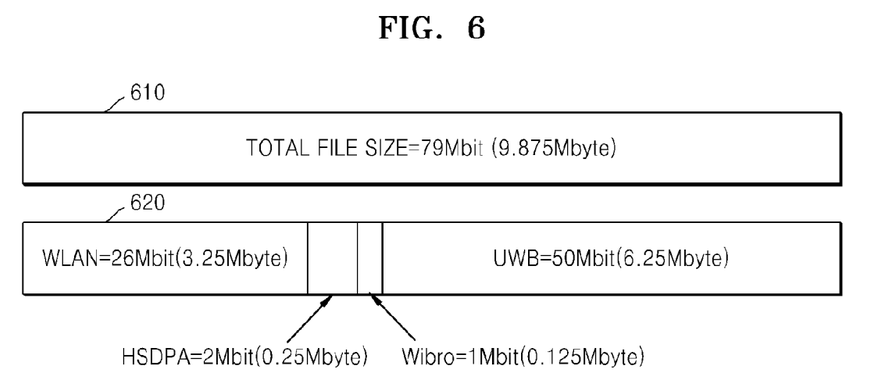
FIG. 6 is a diagram for explaining a method of communicating data by using a plurality of network interfaces according to an embodiment of the present invention.

FIG. 6 is a diagram for explaining a method of communicating data by using a plurality of network interfaces according to an embodiment of the present invention. FIG. 6 relates to a method for using each of a plurality of network interfaces to communicate data with respect to an external network after the data is divided and is explained in relation to FIG. 4. In FIG. 6, a total size of the data 610 is 9.875 Megabytes (MB). After the data 610 is divided into a plurality of data parts 620, the divided data parts 620 are transmitted or received in such a way that a WLAN interface 432 is allocated 3.25 MB, an HSDPA interface 436 is allocated 0.25 MB, a WiBro interface 434 is allocated 0.125 MB, and a UWB interface 438 is allocated 6.25 MB. Thus, for a single data 610 of one application, the parts can be simultaneously received at corresponding interfaces to more rapidly transmit or receive the entire data 610.

The size of data parts allocated to each of a plurality of network interfaces may be determined based on the performance of each of the network interfaces. For example, the size of data parts allocated to each of the network interfaces may be determined based on the bandwidth of each of the network interfaces.

According to the present method, when the data is divided into a plurality of data parts for allocation to each of a plurality of network interfaces, the position of the divided data parts relative to the data as well as the size of the divided data parts may be predetermined. In other words, by predetermining a position for starting the division and a position for finishing the division in the reception data, the reception data may be divided into the plurality of data parts.

For example, in FIGS. 4 and 6, the data 610 may be divided into the data parts 620 in such a way that the WLAN interface 432 is allocated a data part between 0 MB and 3.25 MB, the HSPDA interface 436 is allocated a data part between 3.25 MB and 3.5 MB, the WiBro interface 434 is allocated a data part between 3.50 MB and 3.625 MB, and the UWB interface 438 is allocated a data part between 3.625 MB and 9.875 MB.

By using such a method, data can be communicated quickly. For example, in FIG. 6, 1.58 seconds is required for the UWB interface 438 having a bit rate of of 50 Megabits per second (Mbps) to communicate the whole of the 9.875 MB of data, whereas data communication can be completed in only 1 second by means of simultaneous data communication using a plurality of network interfaces 432, 434, 436, and 438.

Preferably, and while not required in all aspects, the control unit 420, according to aspects of the present invention, may further include a transmission/reception control unit (not shown) which divides reception data into a plurality of data parts based on the bandwidth of each of a plurality of network interfaces 432, 434, 436 and 438 and allocates the divided data parts to each of the network interfaces 432, 434, 436 and 438. Once the transmission/reception control unit divides the data into the plurality of data parts and allocates the divided data parts to each of the plurality of network interfaces 432, 434, 436, and 438, each of the plurality of network interfaces is allocated the data parts corresponding to the size of the divided data parts.

The method described with reference to FIG. 6 can be applied to data transmission as well as data reception and the division of data as well as the reconstruction of data.

Figure 7:
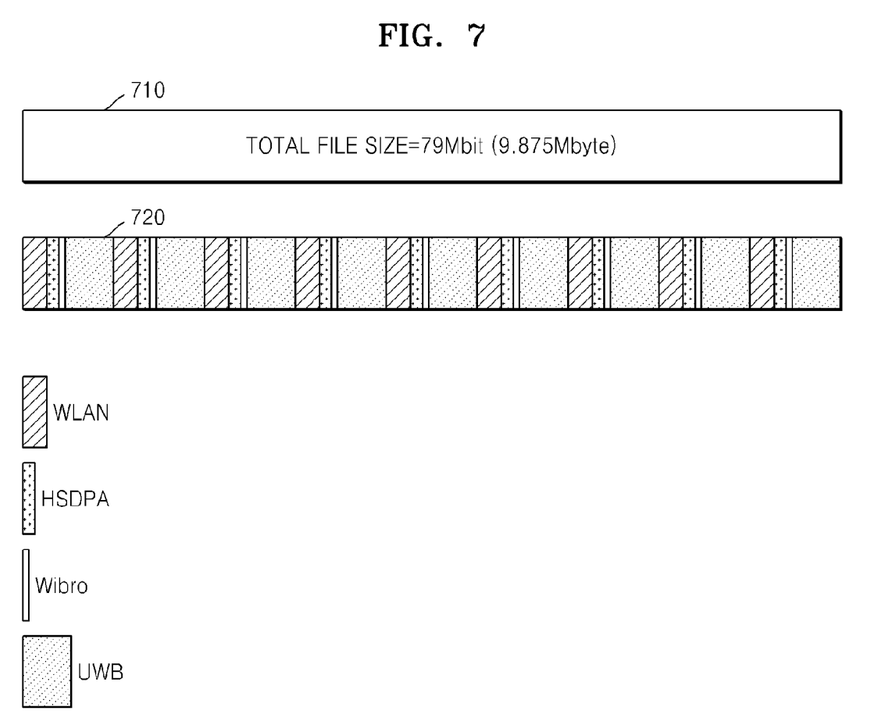
FIG. 7 is a diagram for explaining a method of communicating data by using a plurality of network interfaces according to another embodiment of the present invention.

FIGS. 4 and 7 are diagrams for explaining a method of communicating data by using a plurality of network interfaces 432, 434, 436 and 438 according to another embodiment of the present invention. FIG. 7 relates to a method for each of a plurality of network interfaces to communicate data 710 after division of the data 710 when it is not known whether or not the total size of data 710 is a fixed amount of data such as 9.875 MB. While described in terms of reception, it is understood that the method can be used in transmission as well as reception.

Referring to FIG. 7, the data 710 is divided into a plurality of data parts 720 in such a way that a WLAN interface 432 is allocated a data part between 0 MB and 0.36 MB, an HSDPA interface 436 is allocated a data part of 0.028 MB from 0.36 MB, a WiBro interface 434 is allocated a data part of 0.014 MB from the data part of the HSDPA interface, and a UWB interface 438 is allocated a data part of 0.695 MB from the data part of the WiBro interface.

When a plurality of different-type data has to be transmitted or received at the same time, they may be transmitted or received via different network interfaces for efficient data transmission or reception. For example, if data A and data B have to be received simultaneously, the data A may be received via a network interface #1 and the data B may be received via a network interface #2.

The method described with reference to FIG. 7 can be applied to data transmission as well as data reception and the division of data as well as the reconstruction of data.

Figure 8:
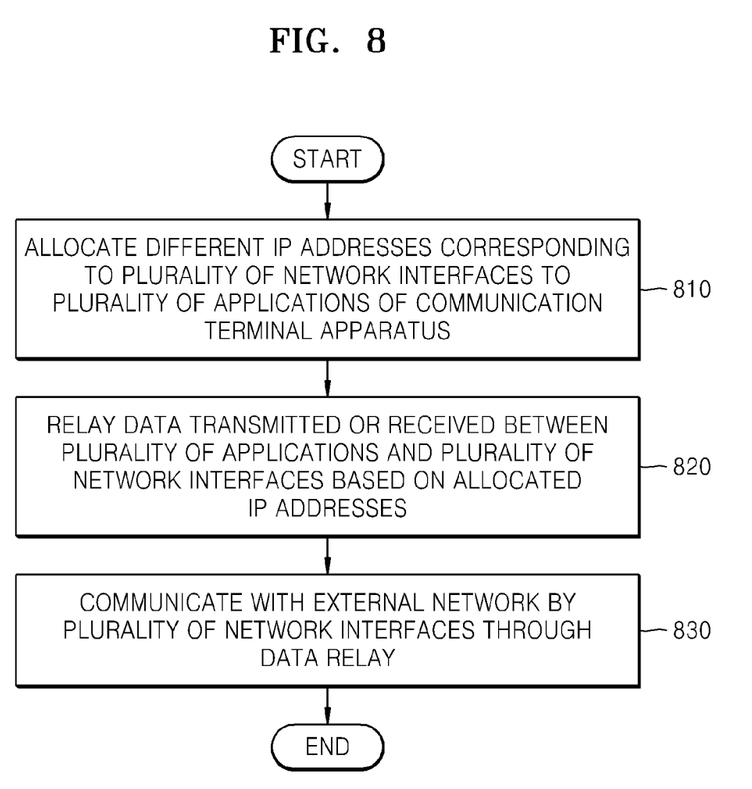
FIG. 8 is a flowchart illustrating a method of performing communication by simultaneously using a plurality of network interfaces mounted on a communication terminal apparatus according to an embodiment of the present invention.

FIG. 8 is a flowchart illustrating a method of performing communication by simultaneously using a plurality of network interfaces mounted on a communication terminal apparatus according to an embodiment of the present invention. Referring to FIG. 8, in operation 810, different IP addresses corresponding to the plurality of network interfaces are allocated to a plurality of applications of the communication terminal apparatus.

In operation 820, data transmitted or received between the plurality of applications and the plurality of network interfaces is relayed based on the allocated IP addresses.

In operation 830, the plurality of network interfaces simultaneously communicate with an external network through the data relay.

As described above, according to aspects of the present invention, communication can be performed by simultaneously using a plurality of network interfaces, thereby improving the efficiency of data transmission.

Furthermore, since communication is performed by using a network interface corresponding to the characteristics of each of a plurality of applications, an error rate in data transmission can be reduced and a quality of service (QoS) can be increased.

Aspects of the present invention can also be embodied as a program that can be implemented on a computer and a general-purpose digital computer executing the program using a computer-readable recording medium.

Examples of the computer readable recording medium include magnetic recording media such as read-only memory (ROM), random-access memory (RAM), floppy disks, and hard disks, optical data storage devices such as CD-ROMs and digital versatile disks (DVDs).

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of performing communication by using a plurality of network interfaces mounted on a communication terminal apparatus, the method comprising:

allocating different Internet protocol (IP) addresses of the plurality of network interfaces to a plurality of applications of the communication terminal apparatus, each network interface having an assigned and dedicated corresponding different IP address;

relaying data transmitted or received between the plurality of applications and the plurality of network interfaces based on the allocated IP addresses, each application assigned to one of the assigned and dedicated corresponding different IP addresses; and simultaneously performing communication with at least one external network via the plurality of network interfaces with relayed data, wherein the performing of the communication comprises dividing the data into a plurality of data parts, such that a size of a respective data part of the plurality of data parts corresponds to a bandwidth of a respective network interface of the plurality of network interfaces, and respectively allocating the divided data parts to the plurality of network interfaces, wherein the plurality of network interfaces transmit or receive the allocated data parts based on the allocation in order to perform the communication, wherein the division of the data into the plurality of data parts comprises determining at least one of a position for starting the division and a position for finishing the division of the data based on a bandwidth of each of the plurality of network interfaces.

2. The method of claim 1, wherein the allocating of the different IP addresses comprises allocating the different IP addresses to the plurality of applications based on respective functions executed by the plurality of applications.

3. The method of claim 2, wherein the allocating further comprises allocating one of the IP addresses corresponding to a one of the constant network interface to one of the applications that executes a function of constantly transmitting or receiving data from among the plurality of applications.

4. The method of claim 2, wherein the allocating further comprises allocating one of the IP addresses corresponding to one of the high-security network interfaces to one of the applications that executes a function of transmitting or receiving data with security guaranteed from among the plurality of applications.

5. The method of claim 2, wherein the allocating further comprises allocating one of the IP addresses corresponding to one of the network interfaces that supports a high bandwidth to one of the applications that executes a function of transmitting or receiving a large amount of data from among the plurality of applications.

6. The method of claim 1, further comprising preventing a degradation of transmission control protocol (TCP) transmission by allocating the different IP addresses to the plurality of applications so that user datagram protocol (UDP) data and TCP data are transmitted or received via different network interfaces when the UDP data and the TCP data exist among the data transmitted or received by the communication terminal.

7. The method of claim 1, wherein the division of the data into the plurality of data parts comprises determining a position for starting the division and a position for finishing the division of the data based on a bandwidth of each of the plurality of network interfaces.

8. The method of claim 1, wherein the performing of the communication comprises transmitting or receiving a plurality of different-type data via different network interfaces when the plurality of different-type data have to be simultaneously transmitted or received.

9. A communication terminal apparatus, comprising:
a computer, including;
a plurality of network interfaces, each having an assigned and dedicated corresponding different Internet protocol (IP) address for communication between the communication terminal apparatus and an external network;
an address allocation unit to allocate the different IP addresses corresponding to the plurality of network interfaces to a plurality of applications of the communication terminal apparatus, each application assigned to one of the assigned and dedicated corresponding different IP addresses;
a relay unit to relay data transmitted or received between the plurality of applications and the plurality of network interfaces based on the allocated IP addresses; and
a transmission/reception control unit to divide the data into a plurality of data parts, such that a size of a respective data part of the plurality of data parts corresponds to a bandwidth of a respective network interface of the plurality of network interfaces, and to respectively allocate the divided data parts to the plurality of network interfaces,
wherein the plurality of network interfaces simultaneously performs communication with the external network through the data relayed through the relay unit,
wherein the plurality of network interfaces transmit or receive the allocated data parts based on the allocation of the transmission/reception control unit in order to perform the communication, and
wherein the transmission/reception control unit determines at least one of a position for starting the division and a position for finishing the division of the data based on a bandwidth of each of the plurality of network interfaces.

10. The communication terminal apparatus of claim 9, wherein the address allocation unit allocates the different IP addresses to the plurality of applications based on functions executed by the plurality of applications.

11. The communication terminal apparatus of claim 10, wherein the address allocation unit allocates an IP address that corresponds to a constant network interface to an application that executes a function that constantly transmits or receives data from among the plurality of applications.

12. The communication terminal apparatus of claim 10, wherein the address allocation unit allocates an IP address corresponding to a high-security network interface to an application from among the plurality of application wherein the application executes a function of transmitting or receiving data with security guaranteed.

13. The communication terminal apparatus of claim 10, wherein the address allocation unit allocates an IP address corresponding to a network interface that supports a wide bandwidth to an application that executes a function of transmitting or receiving data of a large size from among the plurality of applications.

14. The communication terminal apparatus of claim 9, wherein the address allocation unit prevents a degradation of transmission control protocol (TCP) transmission by allocating the different IP addresses to the plurality of applications so that user datagram protocol (UDP) data and TCP data are transmitted or received via different network interfaces when the UDP data and the TCP data exist among the transmitted or received data.

15. The communication terminal apparatus of claim 9, wherein the transmission/reception control unit determines a position for starting the division and a position for finishing the division of the data based on a bandwidth of each of the plurality of network interfaces.

16. The communication terminal apparatus of claim 9, wherein the communication is performed by transmitting or receiving a plurality of different-type data via different network interfaces when the plurality of different-type data have to be simultaneously transmitted or received.

17. A communication terminal apparatus, comprising:
a computer, comprising:
a plurality of network interfaces through which data is transmitted or received in data packets with respect to at least one external network, each network interface being assigned a different dedicated Internet protocol (IP) address; and
a control unit which assigns to elements of the data a corresponding different dedicated one of the IP addresses and controls the transmission or reception of each element with respect to the network interface according to assigned IP addresses,
wherein the data is divided into a plurality of data parts, such that a size of a respective data part of the plurality of data parts corresponds to a bandwidth of a respective network interface of the plurality of network interfaces, and the divided data parts are respectively allocated to the plurality of network interfaces for transmission or reception,
wherein the plurality of network interfaces transmit or receive the allocated data parts based on the allocation in order to perform the communication, and
wherein the division of the data into the plurality of data parts comprises determining at least one of a position for starting the division and a position for finishing the division of the data based on a bandwidth of each of the plurality of network interfaces.

18. The communication terminal apparatus of claim 17, wherein the control unit comprises:
an address allocation unit to allocate the different IP addresses of the plurality of network interfaces to a plurality of applications of the communication terminal apparatus, each application being assigned a corresponding one of the different IP addresses; and
a relay unit to relay data transmitted or received between the plurality of applications and the plurality of network interfaces based on the allocated IP addresses.

19. The communication terminal apparatus of claim 18, further comprising a socket interface with a buffer to relay the data transmitted or received between the plurality of applications and the control unit, wherein the buffer for a relay operation buffers the data transmitted or received in the buffer.

20. The communication terminal apparatus of claim 19, wherein the plurality of network interfaces simultaneously perform communication with the external network through the relay unit to relay data.

21. A non-transitory computer readable medium encoded with instructions implementing a method of performing communication by using a plurality of network interfaces mounted on a communication terminal apparatus executed by one or more computers, the method comprising:
allocating different Internet protocol (IP) addresses of the plurality of network interfaces to a plurality of applications of the communication terminal apparatus, each network interface having an assigned and dedicated corresponding different IP address;
relaying data transmitted or received between the plurality of applications and the plurality of network interfaces based on the allocated IP addresses, each application assigned to one of the assigned and dedicated corresponding different IP addresses; and
simultaneously performing communication with at least one external network via the plurality of network interfaces with relayed data,
wherein the performing of the communication comprises dividing the data into a plurality of data parts, such that a size of a respective data part of the plurality of data parts corresponds to a bandwidth of a respective network interface of the plurality of network interfaces, and respectively allocating the divided data parts to the plurality of network interfaces for transmission or reception,
wherein the plurality of network interfaces transmit or receive the allocated data parts based on the allocating in order to perform the communication, and
wherein dividing of the data into the plurality of data parts comprises determining at least one of a position for starting the division and a position for finishing the division of the data based on a bandwidth of each of the plurality of network interfaces.

22. The method of claim 1, wherein the size of the respective data part corresponds to a bandwidth of a network interface with which the respective data part is associated, and
wherein each data part is respectively associated with a network interface different from the other data parts.

* * * * *